May 23, 1944.  T. D. BARNES  2,349,242
ELECTRICAL MEASURING DEVICE
Filed Jan. 9, 1942
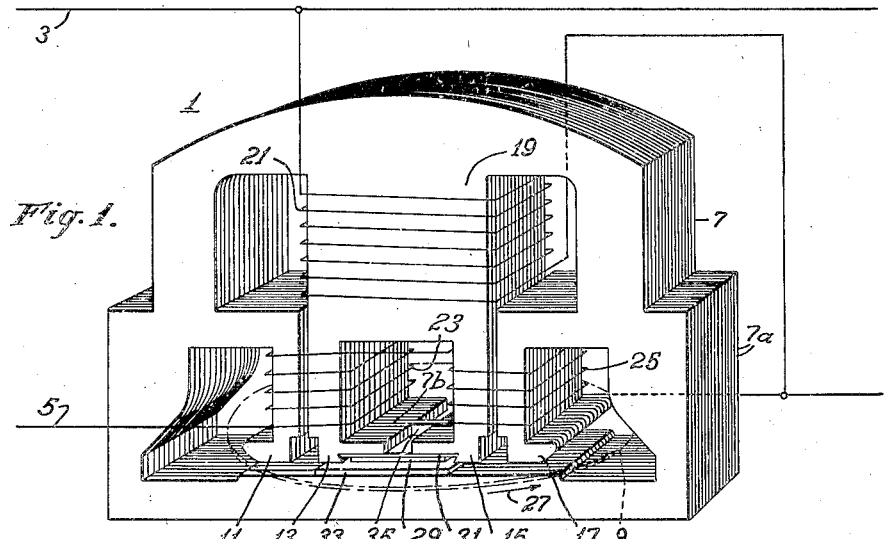
Fig. 1.
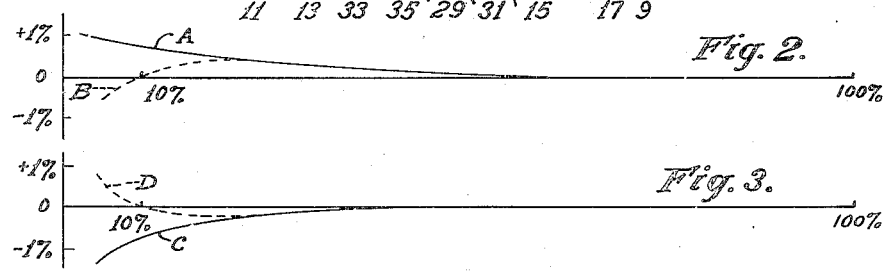
Fig. 2.
Fig. 3.
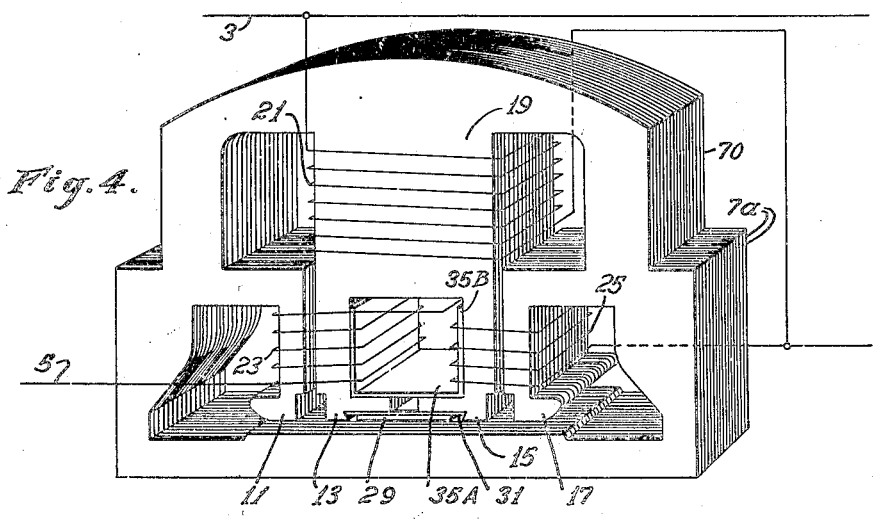
Fig. 4.
WITNESSES:
Edward Michaels
C. L. Freedman
INVENTOR
Thomas D. Barnes.
ATTORNEY Patented May 23, 1944

2,349,242

UNITED STATES PATENT OFFICE 2,349,242

ELECTRICAL MEASURING DEVICE

Thomas D. Barnes, West Orange, N. J., assignor to Westinghouse Electric & Manufacturing Company, East Pittsburgh, Pa., a corporation of Pennsylvania Application January 9, 1942, Serial No. 426,199

11 Claims. (Cl. 171—34)

This invention relates to electrical devices responsive to energization having a substantial range of variation, and it has particular relation to electrical watthour meters.

Many electrical devices are designed for response to energizations having substantial ranges of variations. In such cases, it is desirable that the devices have accurate responses over the entire range of their respective energizations. As a specific example of this class of electrical devices, reference may be made to a watthour meter.

The modern watthour meter is designed for response to a range of energization which may vary from zero to three or four times the rated energization thereof. Despite this wide range of energization, it is required that the watthour meter register accurately at all times. For this purpose, it is customary to provide the watthour meter with certain compensations and adjustments. For example, a watthour meter customarily includes an overload shunt which maintains accurate registration from approximately the rated energization of the meter to three or four times the rated energization or load thereof. Moreover, the watthour meter usually includes light load and full load adjusters which may be operated to correct the performance of the watthour meter at full load and at a predetermined light load, such as 10% of the rated load.

If the watthour meter has an inherent characteristic such that its per cent registration curve drops from a predetermined light load value to a lower value at higher loads, it is necessary to operate the light load adjuster to introduce a torque sufficient to compensate the meter at its predetermined light load adjustment point, such as 10% of its rated load. Under these conditions, the per cent registration curve droops in the range between zero and 10% load. This drooping characteristic is objectionable. A rising characteristic in this range is desired to assure good starting performance. Moreover, a rising characteristic is desirable in this region in order to compensate for any increase in starting friction resulting from ageing of the watthour meter.

In accordance with the invention, a watthour meter is provided with a shunt designed to saturate or operate with decreasing permeability in the light load range, as between 10% and 20% of the rated energization or load of the watthour meter. Since the shunt must operate at extremely low magnetomotive forces, it preferably is provided with a shunt portion extending between the current poles of the watthour meter and arms angularly directed away from the shunt portion and contacting substantial areas of the current poles. Conveniently, the shunt may be formed by providing one of the laminations of the meter magnetic core with an integral extension connecting the current poles adjacent the current pole faces. The integral extension is designed to saturate within the desired light load range, and constitutes a magnetic shunt. This magnetic shunt includes arms extending within the current windings of the watthour meter to form a continuous magnetic path or loop. When such a magnetic shunt is combined with a conventional overload shunt, accurate registration of the watthour meter is assured over an extremely wide range of energization of the watthour meter.

It is, therefore, an object of the invention to provide an electrical device responsive to energization subject to a wide range of variation and having an accurate response to the energization substantially over the entire range of variation thereof.

It is another object of the invention to provide a watthour meter having a magnetic shunt designed for saturation in the light load range of the watthour meter.

It is a further object of the invention to provide a watthour meter having current poles bridged by a magnetic shunt which directly contacts the current poles over substantial contact areas.

It is another object of the invention to provide a watthour meter having a substantially continuous magnetic shunt loop passing through one or more current windings.

It is a still further object of the invention to provide a watthour meter having a first magnetic shunt designed for saturation in the light load range of the watthour meter and having an overload shunt designed for saturation in a substantially higher load range of the watthour meter.

Other objects of the invention will be apparent from the following description taken in conjunction with the accompanying drawing, in which:

Figure 1 is a view in perspective of a watthour meter embodying the invention;

Figs. 2 and 3 are graphical representations of watthour meter characteristic curves wherein abscissae represent per cent of rated watthour meter load and ordinates represent percent of error of registration of the watthour meter; and Fig. 4 is a view in perspective of a watthour meter electromagnet embodying a modified form of the invention.

Referring to the drawing, Fig. 1 shows an electrical device in the form of a watthour meter 1 which is associated with the conductors 3 and 5 of an alternating current electrical circuit for measuring electrical energy flowing therethrough. The watthour meter 1 includes an electromagnet having a magnetic core 7. This core conveniently may be formed of a plurality of laminations 7a of soft iron or steel. The magnetic core 7 is designed to provide an air gap within which an electroconductive armature or disk 9 is mounted for rotation. It will be observed that the magnetic core 7 has a plurality of pole elements 11, 13, 15 and 17, all of which are positioned on one side of the electroconductive armature or disk 9. The pole elements 13 and 15 constitute extensions of a voltage pole 19 and are designed to direct a magnetic flux into the disk 9 which may be termed a voltage magnetic flux. For producing the voltage magnetic flux, a voltage winding 21 surrounds the voltage pole 19 and is connected for energization in accordance with the voltage across the conductors 3 and 5.

The pole elements 11 and 13 together constitute one current pole structure which is surrounded by a current winding 23 and which serves to direct a magnetic flux into the disk 9 that may be termed a current magnetic flux. Similarly, the pole elements 15 and 17 constitute a second current pole structure which is surrounded by a current winding 25. The current windings 23 and 25 are reversely wound to produce a current magnetic flux which flows upwardly through one current winding when the current magnetic flux flows downwardly through the remaining current winding. As clearly shown in Fig. 1, the current windings 23 and 25 are connected in series for energization in accordance with current flowing in the conductor 5.

As well understood in the art, energization of the voltage winding 21 and the current windings 23 and 25 produces a shifting magnetic field in the gap containing the armature or disk 9. Under the influence of the shifting magnetic field, the armature or disk 9 rotates in a predetermined direction, such as that represented by the arrow 27, in accordance with the energy flowing through the conductors 3 and 5. A permanent magnet (not shown) conventionally is associated with the armature or disk for governing the rate of rotation thereof.

In order to assure correct registration of the watthour meter 1 over a substantial range of energization thereof, it is customary practice in the art to provide the watthour meter with a magnetic shunt 29 which is positioned between the pole elements 13 and 15. The magnetic shunt 29 is spaced from the pole elements by means of a non-magnetic spacer 31 which may be formed of brass or other suitable non-magnetic material. Non-magnetic gaps also are left between each end of the magnetic shunt 29 and the associated pole element. The magnetic shunt 29 is proportioned to saturate when the magnetomotive force thereacross corresponds to a substantial flow of energy or load current through the watthour meter. Such saturation may take place when the flow of energy or load current is approximately equal to the rated energization or load current of the watthour meter. The term "saturated" as herein employed carries the connotation of "decremental permeability," "effective decrease in permeability," or "relatively fast reduction in permeability." The magnetic shunt 29 may take one of the forms disclosed in my prior Patents Nos. 2,162,522 and 2,177,274.

The construction and operation of the portion of the watthour meter 1 thus far described are well known in the art. A disclosure of a somewhat similar watthour meter is found in the Bradshaw Patent No. 1,725,051.

The inherent properties of the watthour meter 1 thus far described produce a registration curve similar to the curve A of Fig. 2. In Fig. 2, per cent error in registration of the watthour meter is plotted as ordinates against per cent load as abscissae. It will be observed that the curve A drops from a substantial registration error at light loads to accurate performance at full load.

In order to correct the performance of the watthour meter 1 at light loads, it is conventional to provide the watthour meter with a light load adjuster which may take the form of an electroconductive plate 33 positioned beneath the pole elements 13 and 15 and movable relative thereto. A light load adjustment of this type is disclosed in the La Bar Patent No. 1,691,354. As well understood in the art, the plate 33 is adjusted to provide a reverse torque sufficient to drop the light load portion of the curve A in Fig. 2 to the position represented by the dotted curve B. Consequently, adjustment of the plate 33 corrects the watthour meter 1 for operation at a predetermined light load which, in this case, is 10% of the rated load of the watthour meter.

From an inspection of Fig. 2, it will be observed that the curve B has a drooping characteristic in the range between 0 and 10% of rated load. As previously pointed out, such a drooping characteristic is objectionable for the reason that it indicates poor starting performance of the watthour meter.

In order to correct the starting characteristics of the watthour meter 1, a magnetic shunt 35 is employed which is designed to saturate in a predetermined light load range, such as 10 to 20% of rated load. It should be pointed out that a shunt similar to the overload shunt 29 cannot be employed satisfactorily for this purpose. The construction of the magnetic shunt 29 is such that at the low magnetomotive forces thereacross corresponding to the flow of small load currents through the current windings 23 and 25, very little magnetic flux flows through the magnetic shunt. Consequently, it is extremely difficult from a practical standpoint to design such a magnetic shunt which will saturate when subjected to these small magnetomotive forces. Furthermore, the proportion of current magnetic flux which is diverted through such a magnetic shunt when subjected to the small magnetomotive forces is insufficient to provide substantial corrective action in the light load performance of the watthour meter.

The light load magnetic shunt may take the form of an integral extension of one or more of the magnetic laminations forming the magnetic core 7 designed to bridge the pole elements 13 and 15. In the specific embodiment of Fig. 1, one of the magnetic laminations 7b is provided with an extension 35 which bridges the space between the pole elements 13 and 15. This extension 35 constitutes a magnetic shunt and is designed to saturate for magnetomotive forces thereacross which correspond to the flow of a load current through the current windings 23 and 25 in the range of 10 to 20% of the rated load current of the watthour meter. From the configuration of the lamination 7b, it will be understood that the magnetic shunt 35, in effect, has an arm at each end extending along the pole elements 13 and 15. These arms contact the remainder of the pole elements over substantial areas and assure a low magnetic reluctance between the magnetic shunt 35 and the pole elements 13 and 15. Consequently, a substantial proportion of the current magnetic flux flows through the magnetic shunt 35 when the watthour meter 1 is operating under light load conditions.

It will be appreciated that the laminations 7b may be positioned at any desired point in the stack of laminations. As a specific example, the lamination 7b is illustrated as positioned centrally of the stack. Furthermore, the material and thickness of the lamination 7b may differ, if desired from those of the remaining laminations 7a. It has been found, however, that a satisfactory watthour meter may be designed wherein the laminations 7a and 7b all are of similar material and thickness.

It should be noted further that the magnetic lamination 7b provides a completely closed magnetic loop or path passing through the current windings 23 and 25. For this additional reason, substantial magnetic flux passes through the magnetic shunt 35 under light load conditions.

The effect of the magnetic shunt 35 on the watthour meter 1 may be understood more readily by reference to Fig. 3. In Fig. 3 the curve C represents the inherent registration curve of the watthour meter 1 when equipped with the magnetic shunt 35. It will be observed that the effect of the magnetic shunt 35 is to drop the curve in the light load region. Consequently, if the watthour meter 1 is to be corrected at 10% of its rated load, the plate 33 must be adjusted to produce a forward torque sufficient to raise the light load portion of the curve C to the position represented by the dotted curve D. The dotted curve D shows that the watthour meter 1 as compensated by the magnetic shunt 35 exhibits excellent starting torque and light load performance.

It is believed that the operation of the invention is apparent from the foregoing discussion. When the watthour meter 1 is connected to the conductors 3 and 5 and the windings 21, 23 and 25 are energized, a shifting magnetic field is produced tending to rotate the armature or disk 9 in the direction of the arrow 27. As the energy or load current flowing through the conductors 3 and 5 increases from zero, the watthour meter 1 initially exhibits good starting torque because of the characteristic of the curve D in the light load region. Moreover, under light load conditions, the magnetic shunt 35 is in unsaturated condition, and a substantial proportion of the current magnetic flux flows therethrough. As the load current or energy flowing through the conductors 3 and 5 increases, the magnetomotive force across the magnetic shunt 35 also increases until at a predetermined light load condition which may occur between 10 and 20% of rated load, the magnetic shunt 35 saturates or operates with decreasing permeability. After the magnetic shunt 35 saturates, it has substantially no further influence on the performance of the watthour meter 1.

Still further increases in the load current or energy flowing in the conductors 3 and 5 increase the magnetomotive force across the magnetic shunt 29, and, consequently, a substantial proportion of the current magnetic flux begins to flow through the magnetic shunt 29. At a predetermined value of magnetomotive force across the magnetic shunt 29, which may correspond to approximately the rated load of the watthour meter 1, the magnetic shunt 29 saturates or operates with decreasing permeability. Therefore, the magnetic shunt 29 tends to maintain accurate registration of the watthour meter 1 over a higher load range which may vary from 100% to 300% or 400% of the rated load. From this brief discussion, it will be appreciated that the magnetic shunt 35 and the magnetic shunt 29 coact to provide accurate operation of the watthour meter 1 over an extensive range of load variation.

In the modification illustrated in Fig. 4, a magnetic core 70 is illustrated which is similar to the magnetic core 7 of Fig. 1 except for the omission of the magnetic shunt 36. In other words, only the laminations 7a are present in the magnetic core 70. To improve the performance of the magnetic core 70, a magnetic shunt 35A is positioned between the pole elements 13 and 15, and is provided with arms 35B which extend along the pole elements 13 and 15 and engage the pole elements over substantial areas. Consequently, the magnetic reluctance between the magnetic shunt 35A and the pole elements 13 and 15 is held to an extremely low value. It will be observed that the arms 35B and the magnetic shunt 35A are in the form of a U-shaped structure. The arms 35b are positioned to be surrounded by the current windings 23 and 25.

It will be understood further that the magnetic shunt 35A is proportioned to saturate when the magnetomotive force thereacross corresponds to a light load energization of the watthour meter which may be in the range of 10 to 20% of the rated load. Consequently, the operation of the shunt 35A is similar to that of the preferred shunt 35 illustrated in Fig. 1. It is believed that the full operation of a watthour meter employing the magnetic core 70 of Fig. 4 is apparent from the detailed description of the watthour meter illustrated in Fig. 1.

Although the invention has been described with reference to certain specific embodiments thereof, numerous modifications are possible. Therefore, the invention is to be restricted only by the appended claims when interpreted in view of the prior art.

I claim as my invention:

1. In an electrical device, a magnetic core having spaced pole elements defining an air gap, means associated with said magnetic core for producing a variable magnetomotive force across said pole elements, and a magnetic shunt extending between the pole elements for diverting magnetic flux away from said air gap, said magnetic shunt having a portion in engagement with each of said pole elements, whereby substantial magnetic flux flows through said magnetic shunt for low values of said variable magnetomotive force, and said magnetic shunt being designed to saturate within the range of variation of said variable magnetomotive force.

2. In an electrical device, a magnetic core having spaced pole elements defining an air gap, means associated with said magnetic core for producing a shifting magnetic field in said air gap, an electroconductive armature mounted for rotation in said air gap under the influence of said magnetic field, and a magnetic shunt having a portion extending between and in engagement with each of said pole elements for establishing a path for magnetic flux therebetween, each end of said shunt being constructed to provide a surface extending away from said portion at an angle and engaging a separate one of said pole elements.

3. In an electrical measuring device, a magnetic core having an air gap, said magnetic core including a pair of spaced pole elements having pole faces adjacent said air gap, magnetizing means for producing a shifting magnetic field in said air gap, said magnetizing means including means for establishing a variable magnetomotive force between said pole elements, an electroconductive armature mounted for rotation in said air gap in response to said shifting magnetic field, and a magnetic shunt having a pair of arms joined at one end by a connecting member to define a substantially U-shaped configuration, said shunt being positioned in engagement with said pole elements with said connecting member extending between said pole elements adjacent said pole faces for diverting magnetic flux away from said air gap, each of said pole elements having a surface engaging a substantial portion of a separate one of said arms whereby said magnetic shunt offers a low magnetic reluctance to magnetic flux produced by said magnetomotive force, said shunt being proportioned to saturate at a low value of said variable magnetomotive force.

4. In an electrical measuring device, a magnetic core having an air gap, said magnetic core including a pair of spaced pole elements having pole faces adjacent said air gap, magnetizing means for producing a magnetic field in said air gap, said magnetizing means including windings surrounding said pole elements for producing a variable magnetomotive force thereacross, a magnetic shunt positioned between and in engagement with each of said pole elements for establishing a path for magnetic flux therebetween, said shunt including a separate magnetic portion extending within each of said windings, and said shunt being constructed to saturate within the range of variation of said magnetomotive force for which said device is designed.

5. In an electrical measuring device, a magnetic core having an air gap, magnetizing means associated with said magnetic core for producing a variable magnetic field in said air gap, said magnetizing means including a winding for producing magnetic flux in said magnetic core, and a magnetic shunt for controlling said magnetic field, said magnetic shunt comprising a continuous magnetic loop having a portion passing through said winding for providing an auxiliary continuous magnetic path for magnetic flux produced by said winding, said magnetic loop having at least a portion designed to saturate within the range of energization of said winding.

6. In an electrical measuring device, a plurality of magnetic laminations each having a pair of spaced pole portions projecting therefrom, said magnetic laminations being stacked to provide a magnetic core having a pair of spaced pole elements, means associated with said magnetic core for producing a variable magnetomotive force between said pole elements, one of said magnetic laminations including an integral magnetic shunt portion connecting the pole portions of said one of said magnetic laminations, said shunt portion extending between said pole elements for establishing a path for magnetic flux produced by said magnetomotive force, said magnetic shunt portion being constructed to saturate within the range of variation of said magnetomotive force for which said measuring device is designed.

7. In an electrical meter, an electromagnetic structure for producing a shifting magnetic field in an air gap, and an electroconductive armature mounted for rotation in said air gap; said electromagnetic structure comprising a laminated magnetic core having a plurality of voltage and current pole elements positioned on one side of said armature for directing current and voltage magnetic fluxes into said armature, the laminations of said magnetic core being substantially similar in shape, and magnetizing means for producing said magnetic fluxes, said magnetizing means including means for establishing a variable magnetomotive force between a pair of said pole elements; one of said laminations having an integral portion bridging the space between said pole elements for diverting magnetic flux therebetween away from said armature, said integral portion being designed to saturate at a value of said variable magnetomotive force within the range of variation thereof for which said electromagnetic structure is designed.

8. In an electrical meter, a magnetic core having an air gap, an electroconductive armature mounted for rotation in said air gap, said magnetic core having a plurality of pole elements positioned on the same side of said electroconductive armature for applying current and voltage magnetic fluxes to said armature, means associated with said magnetic core for producing current and voltage magnetic fluxes in said pole elements, and magnetic shunt means establishing an auxiliary magnetic path for said current magnetic flux, said magnetic shunt means including a magnetic shunt member extending between and directly engaging a pair of said pole elements which carry current magnetic flux.

9. In an electrical meter, an electromagnetic structure for producing a shifting magnetic field in an air gap, and an electroconductive armature mounted for rotation in said air gap; said electromagnetic structure comprising a magnetic core having a plurality of voltage and current pole elements positioned on one side of said armature for directing current and voltage magnetic fluxes into said armature, and magnetizing means for producing said magnetic fluxes, said magnetizing means including means for establishing a variable magnetomotive force between a pair of said pole elements; and a magnetic shunt associated with said pair of pole elements for diverting magnetic flux therebetween away from said armature, said magnetic shunt having portions intimately engaging the pole elements of said pair, and having a portion constructed to saturate at a low value of said variable magnetomotive force within the range of variation thereof for which said electromagnetic structure is designed.

10. In an electrical meter, a magnetic core having an air gap, an electroconductive armature mounted for rotation in said air gap, said magnetic core including a pair of spaced pole elements positioned to direct magnetic flux into said armature, means associated with said magnetic core for establishing a variable magnetomotive force between said pole elements and for establishing a shifting magnetic field in said air gap, a first magnetic shunt assembly establishing a path responsive to said magnetomotive force for diverting magnetic flux between said pole elements away from said armature, said path including a first saturable magnetic shunt and a non-magnetic gap, and a second magnetic shunt assembly establishing a second path responsive to said magnetomotive force for diverting magnetic flux between said pole elements away from said armature, said second magnetic shunt assembly comprising a second saturable magnetic shunt intimately engaging said pole elements, said second magnetic shunt being proportioned to saturate at a value of said magnetomotive force substantially smaller than the value at which said first magnetic shunt saturates.

11. In an electrical meter, an electromagnetic structure for producing a shifting magnetic field in an air gap, and an electroconductive armature mounted for rotation in said air gap; said electromagnetic structure comprising a magnetic core having a plurality of voltage and current pole elements positioned on one side of said armature for directing current and voltage magnetic fluxes into said armature, and magnetizing means for producing said magnetic fluxes, said magnetizing means including means for establishing a variable magnetomotive force between a pair of said pole elements; a first magnetic shunt assembly establishing a path responsive to said magnetomotive force for diverting magnetic flux between said current pole elements away from said armature, said path including a first saturable magnetic shunt and a non-magnetic gap, and a second magnetic shunt assembly establishing a second path responsive to said magnetomotive force for diverting magnetic flux between current pole elements away from said armature, said second magnetic shunt assembly comprising a second saturable magnetic shunt intimately engaging said current pole elements, said second magnetic shunt being proportioned to saturate at a value of said magnetomotive force substantially smaller than the value at which said first magnetic shunt saturates.

THOMAS D. BARNES.